United States Patent [19]

Tamura

[11] Patent Number: 5,168,559
[45] Date of Patent: Dec. 1, 1992

[54] EMULATION SYSTEM CAPABLE OF COMPLYING WITH MICROCOMPUTERS HAVING DIFFERENT ON-CHIP MEMORY CAPACITIES

[75] Inventor: Toshinori Tamura, Tokyo, Japan
[73] Assignee: NEC Corporation, Tokyo, Japan
[21] Appl. No.: 337,756
[22] Filed: Apr. 13, 1989
[30] Foreign Application Priority Data
Apr. 13, 1988 [JP] Japan .................. 63-92076
[51] Int. Cl.⁵ .................. G06F 12/00; G06F 9/455
[52] U.S. Cl. .................. 395/425; 395/500; 364/DIG. 1; 364/232.3; 364/243; 364/254.4
[58] Field of Search ... 364/200 MS File, 900 MS File; 395/425, 500

[56] References Cited

U.S. PATENT DOCUMENTS

| | | | |
|---|---|---|---|
| 4,434,462 | 2/1984 | Guttag et al. | 364/200 |
| 4,450,519 | 5/1984 | Guttag et al. | 364/200 |
| 4,450,524 | 5/1984 | Oberman | 364/200 |
| 4,514,805 | 4/1985 | McDonough et al. | 364/200 |
| 4,571,676 | 2/1986 | Mantellina et al. | 364/200 |

Primary Examiner—Eddie P. Chan
Attorney, Agent, or Firm—Foley & Lardner

[57] ABSTRACT

An emulation system which includes an evaluation chip, a program memory and a data memory and is coupled to an external memory comprises an area discriminator for discriminating whether or not a location to be accessed by the evaluation chip is within an on-chip area of a target microcomputer and notifying the evaluation chip of the result of discrimination. On the basis of the result of discrimination, the evaluation chip operates to access the data memory when the space to be accessed by the evaluation chip is within the on-chip area of the target microcomputer and the external memory when the space to be accessed by the evaluation chip is not within the on-chip area of the target microcomputer.

2 Claims, 9 Drawing Sheets

FIGURE 7
FIGURE 8
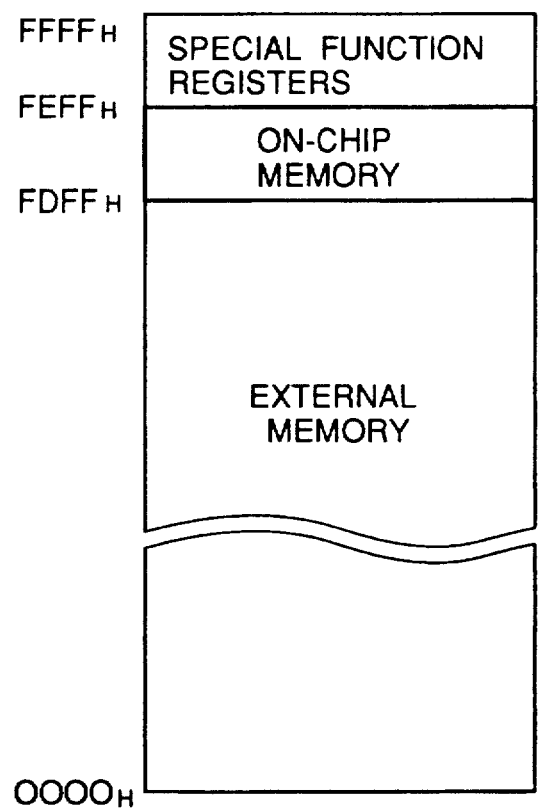
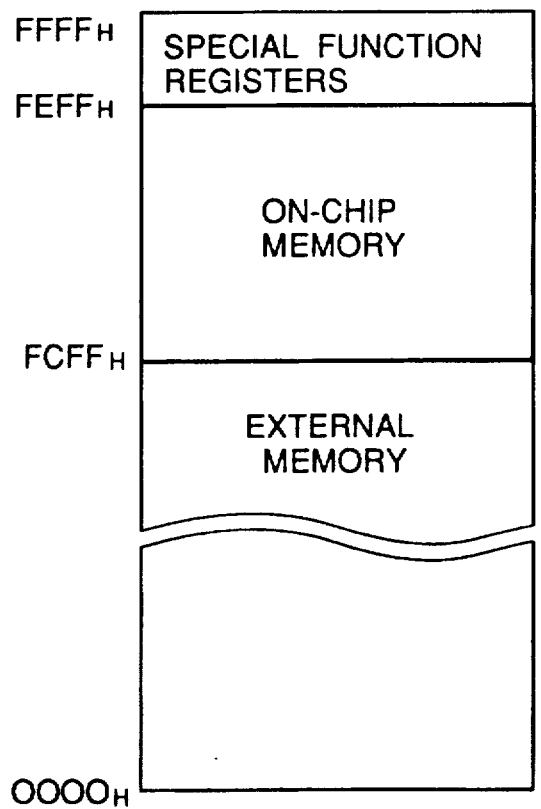

EMULATION SYSTEM CAPABLE OF COMPLYING WITH MICROCOMPUTERS HAVING DIFFERENT ON-CHIP MEMORY CAPACITIES

BACKGROUND OF THE INVENTION

1. Field of the Invention

The present invention relates to an emulation system for microcomputers.

2. Description of Related Art

At present, so-called emulation systems are indispensable to development of programs for different microcomputers. However, the conventional emulation system is constructed under the assumption that a target microcomputer to be emulated has an on-chip memory area of a fixed capacity, for example 256 bytes, and a memory area exceeding 256 bytes is provided as an external memory. Therefore, if a target microcomputer chip having an on-chip memory area of for example 512 bytes is emulated, a first half of the 512 bytes is accessed as an on-chip memory access, but a second half of the 512 bytes is accessed as an external memory access. In other words, the second half of the 512 bytes cannot be properly emulated as on-chip memory access.

With advanced integrated circuit technology, on the other hand, recent LSIs can access an on-chip memory in two cycles although they still require five cycles for access to an external memory (not the on-chip memory). If the above mentioned second half of the 512 bytes is accessed as an external memory access, the emulation cannot be executed by the emulation system under the same access time as in the case of the target microcomputer.

SUMMARY OF THE INVENTION

Accordingly, it is an object of the present invention to provide an emulation system which has overcome the above mentioned defect of the conventional one.

Another object of the present invention is to provide an emulation system capable of emulating access to an on-chip memory of a target microcomputer having an even larger memory capacity, with the access speed of the target microcomputer.

The above and other objects of the present invention are achieved in accordance with the present invention by an emulation system which includes an evaluation chip, a program memory and a data memory and is coupled to an external memory, comprising means for discriminating whether or not a location to be accessed by the evaluation chip is within an on-chip area of a target microcomputer and notifying the evaluation chip of the result of the discrimination, so that the evaluation chip operates to access the data memory when the location to be accessed by the evaluation chip is within the on-chip area of the target microcomputer and the external memory when the location to be accessed by the evaluation chip is not within the on-chip area of the target microcomputer.

With the above mentioned arrangement, the size or scale of the on-chip memory area is not set within the evaluation chip, but the discriminating means discriminates whether or not the space to be accessed by the evaluation chip is within the on-chip memory area of the target microcomputer, and the evaluation chip is notified of the result of the discrimination. This discrimination can be performed, for example, by decoding an address outputted from the evaluation chip. Therefore, the size or scale which should be deemed as the on-chip memory area can be freely set in the discriminating means, and accordingly, the emulation chip can emulate various target memories having different on-chip memory capacities.

The above and other objects, features and advantages of the present invention will be apparent from the following description of preferred embodiments of the invention with reference to the accompanying drawings.

BRIEF DESCRIPTION OF THE DRAWINGS

FIG. 7 is a memory map illustrating an on-chip memory area of 256 bytes in the first embodiment;

FIG. 8 is a memory map illustrating an on-chip memory area of 512 bytes in the first embodiment;

DESCRIPTION OF THE PREFERRED EMBODIMENTS

Figure 1:
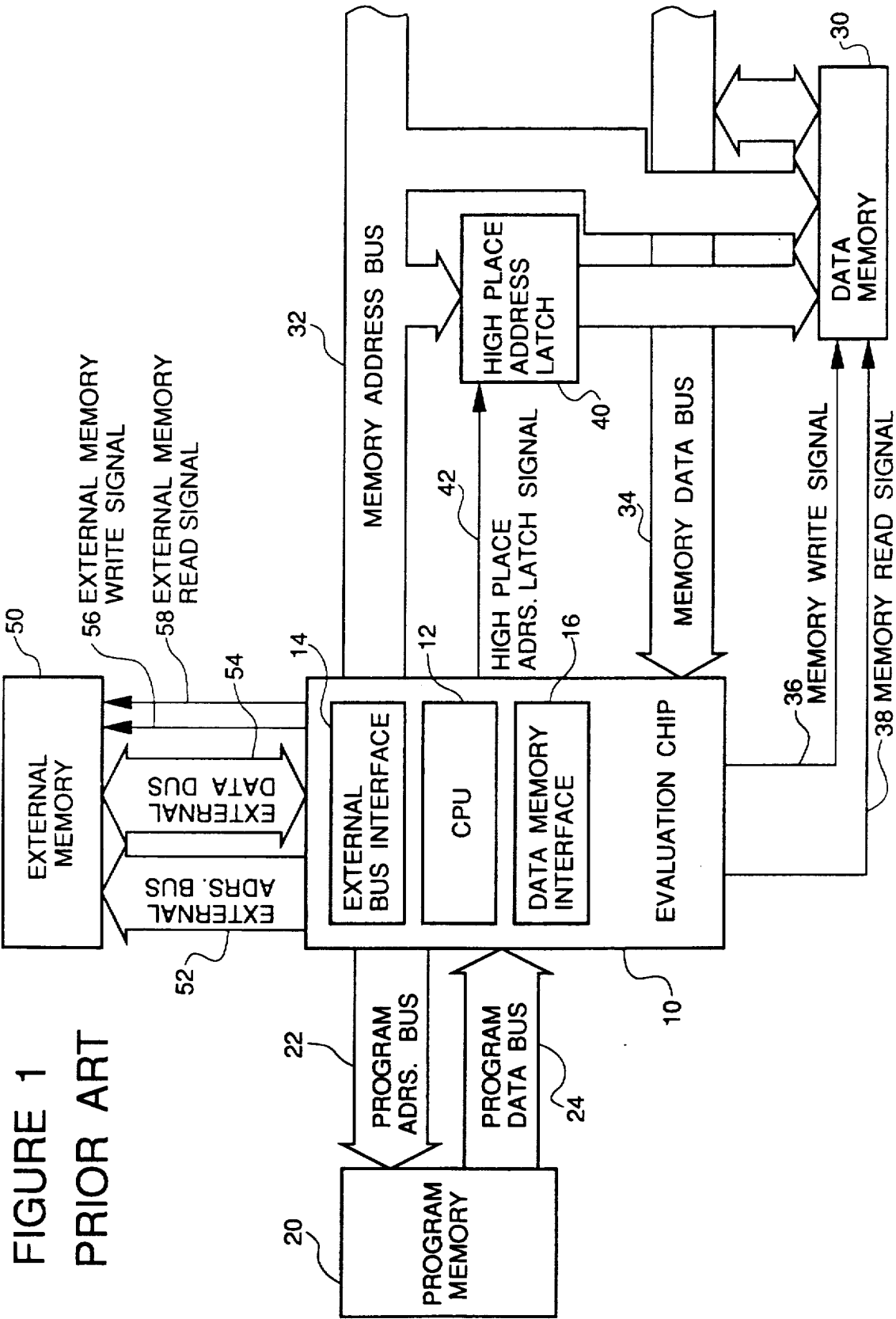
FIG. 1 is a block diagram of a conventional emulation system.

Referring to FIG. 1, there is shown a diagram of one example of the conventional emulation system, which can access an external memory and is able to emulate a microcomputer having an on-chip memory therein. The emulation system shown comprises an evaluation chip 10 which includes therein a central processing unit (called "CPU" hereinafter) 12, an external bus interface 14 and a data memory interface 16. The evaluation chip 10 is coupled to a program memory 20 storing a program therein, through a program address bus 22 which is used for supplying a program address from the evaluation chip 10 to the program memory 20 and through a program data bus 24 which is used for supplying a program read from the program memory 20 to the evaluation chip 10.

Furthermore, the evaluation chip 10 is coupled to a data memory 30 through a memory address bus 32 which is used for supplying a memory address from the evaluation chip 10 to the data memory 20 and through a memory data bus 34 which is used for transferring data between the data memory 30 and the CPU 12 of the evaluation chip 10. In addition, the evaluation chip 10 generates a memory write signal 36 and a memory read signal 38 for the data memory 30.

There is also provided a high order or place address latch 40 which has an input coupled to the memory address bus 32 for temporarily latching a high place portion of an address supplied onto the memory address bus 32. This latch 40 is connected to receive a high place address latch enable signal 42 from the evaluation chip 10, and has an output coupled to the data memory 30 for supplying the latched high place address to the data memory 30.

Furthermore, the evaluation chip 10 is coupled to an external memory 50 through an external address bus 52 which is used for supplying a memory address from the evaluation chip 10 to the external memory 50 through an external address bus 52 which is used for supplying a memory address from the evaluation chip 10 to the external memory 50 and through an external data bus 54 which is used for transferring data between the external memory 50 and the CPU 12 of the evaluation chip 10. In addition, the evaluation chip 10 generates an external memory write signal 56 and an external memory read signal 58 for the external memory 50.

Here, assume that the CPU 12 can access a space of 64 Kbytes. In addition, assume that an area from an address "FE00$_H$" to an address "FEFF$_H$" (256 bytes in total) are set as an on-chip memory area of a target chip or microcomputer, and two system clocks are required to access the on-chip memory area. Here, the suffix "H" attached to the address indicates a hexadecimal notation.

Therefore, if the CPU 12 fetches an instruction from the program memory 20 and the result of instruction decoding indicates that data "96$_H$" should be written into an address "FE5A$_H$", since the high place portion of the address is "FE$_H$", the CPU judges that the data should be written into the on-chip memory area and then starts a necessary write operation.

Figure 2:
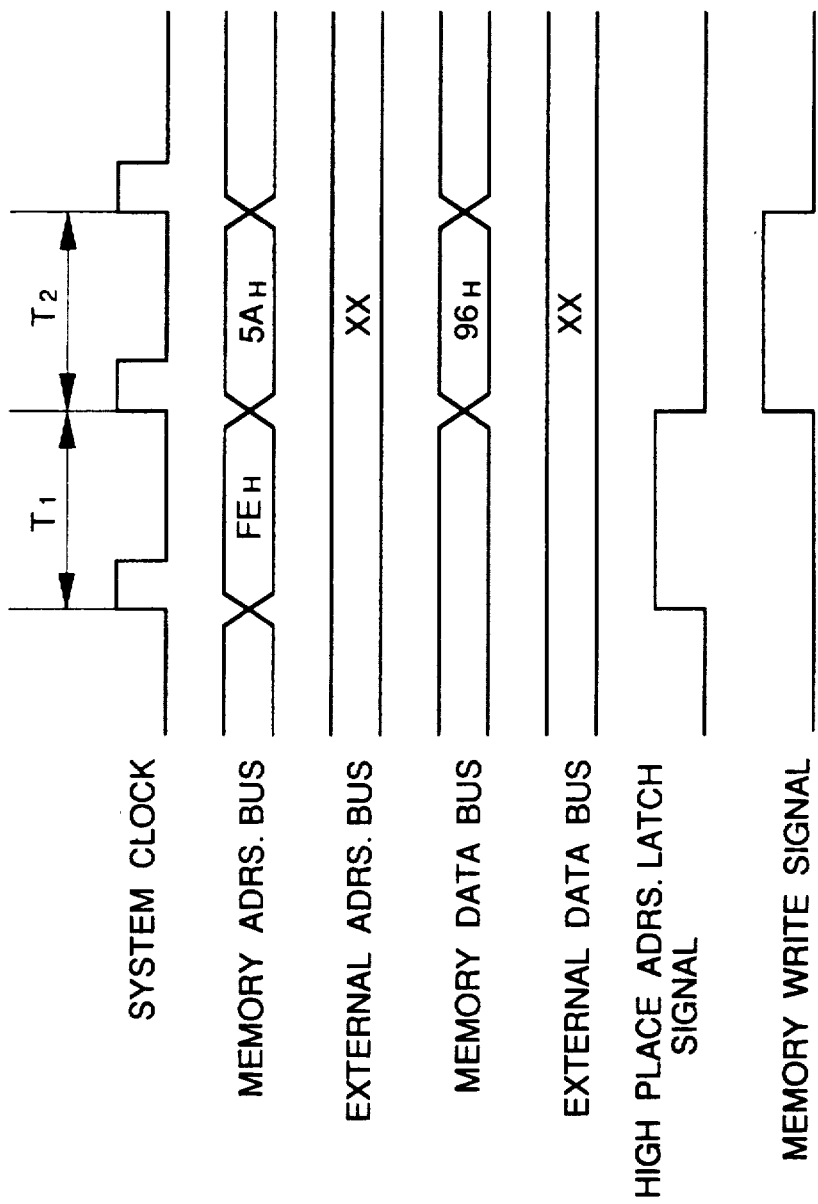
FIG. 2 is a timing chart illustrating the operation of the conventional emulation system in the case of accessing the on-chip memory area.

Referring to FIG. 2, there is illustrated a timing chart of the operation of the emulation system in the case of accessing the on-chip memory area. First, the CPU 12 outputs the high place address "FE$_H$" to the memory address bus 32, and at the same time, activates the high place address latch enable signal 42, so that the high place address "FE$_H$" is latched to the high place address latch 40 in a state T$_1$ shown in FIG. 2. In this condition, the latch 40 supplies the high place address "FE$_H$" to the data memory 30. Thereafter, the CPU 12 outputs a lower place address "5A$_H$" to the memory address bus 32, and at the same time, outputs the data "96$_H$" to the memory data bus 34 and activates the memory write signal 36. Thus, the data "96$_H$" is written from the CPU 12 into the address "FE5A$_H$" of the data memory 30 (state T$_2$). A read operation can be executed similarly to the above mentioned write operation, except that the memory read signal 38 is activated in place of the memory write signal 36 and the CPU 12 fetches data read out onto the memory data bus 34 from the memory 30.

Now, operation for accessing to the external memory, i.e., a memory area other than the on-chip memory, will be explained. If the CPU 12 fetches an instruction from the program memory 20 and the result of the instruction decoding indicates that data "96$_H$" should be written into an address "FD5A$_H$" which does not exist within the on-chip memory area, the CPU judges that the data should be written into a memory area other than the on-chip memory area. In this case, the CPU 12 access through an external bus interface 14 to the memory 50 external to the emulation system. Five system clocks are required for this access.

Figure 3:
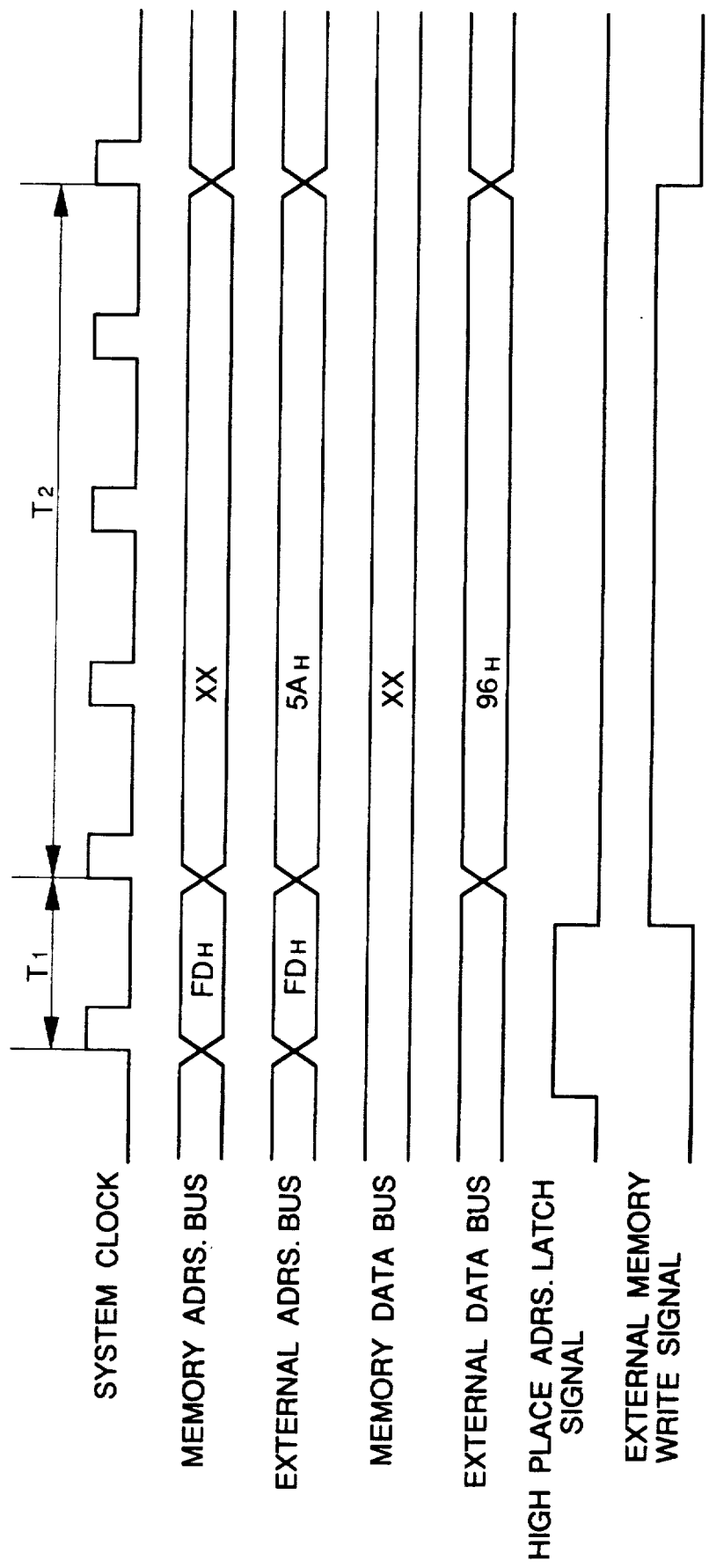
FIG. 3 is a timing chart illustrating the operation of the conventional emulation system in the case of accessing the external memory.

FIG. 3 is a timing chart illustrating the operation of the conventional emulation system in the case of accessing into the external memory. First, the CPU 12 outputs the high place address "FD$_H$" to the external address bus 52 in a state T$_1$ shown in FIG. 3. Thereafter, the CPU 12 outputs the lower place address "5A$_H$" to the external address bus 52, and at the same time, outputs the data "96$_H$" to the external data bus 54 and activates the external write signal 56. Thus, the data "96$_H$" is written from the CPU 12 into the address "FD5A$_H$" of the memory area other than the on-chip memory area (state T$_2$). However, the state T$_2$ for external access is composed of four system clocks. A read operation can be executed similarly to the above mentioned write operation, except that the external read signal 58 is activated in place of the external write signal 56 and the CPU 12 fetches data read out onto the external data bus 34 from the external memory.

In the above mentioned example, if a target microcomputer has therein an on-chip memory area whose capacity exceeds 256 bytes, an access to a portion of the on-chip memory area exceeding 256 bytes will be processed as an external access which needs the five system clocks. Therefore, the portion of the on-chip memory area exceeding 256 bytes cannot be properly emulated as an on-chip memory area access.

Figure 4:
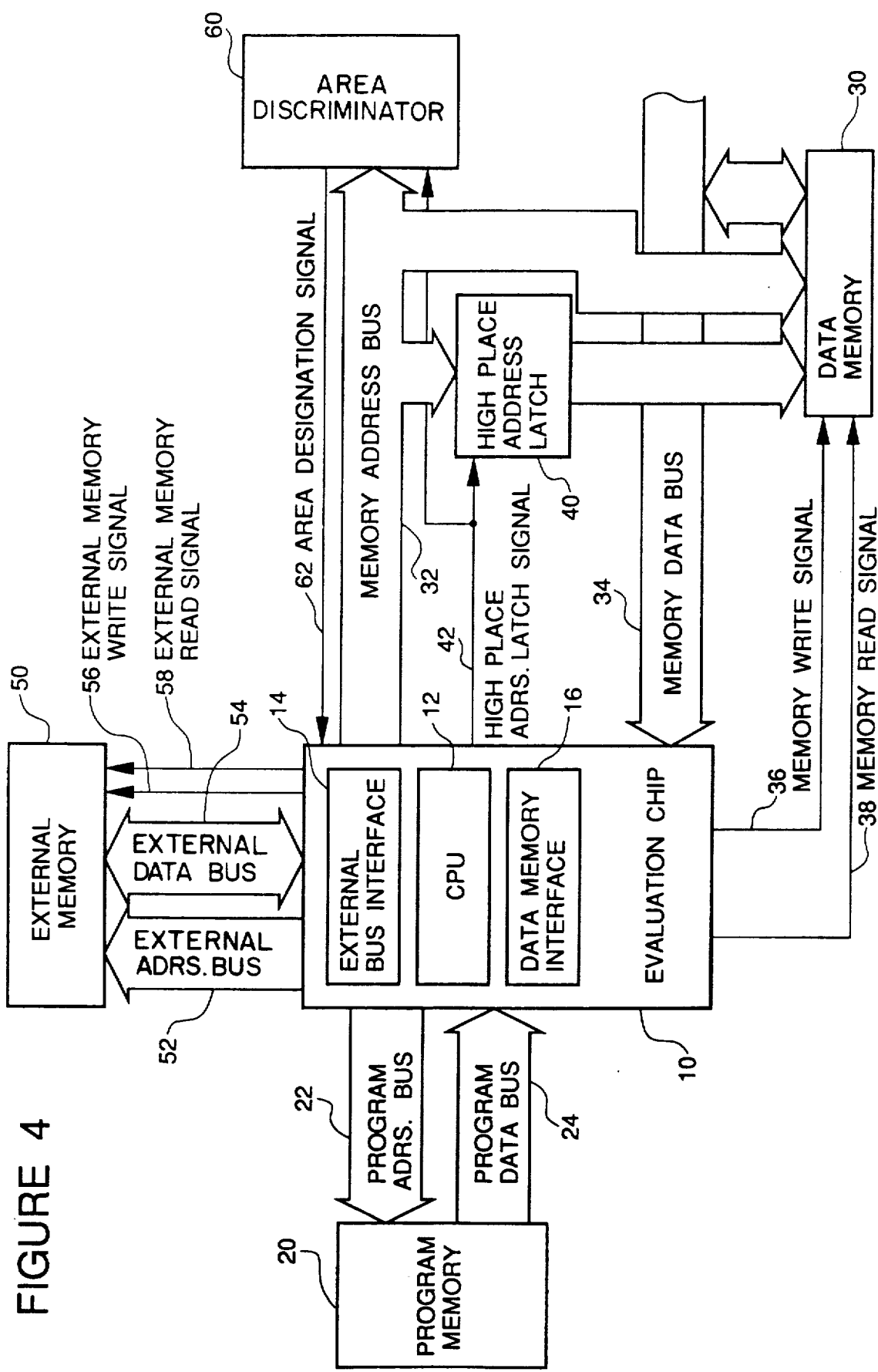
FIG. 4 is a block diagram of a first embodiment of the emulation system in accordance with the present invention.
Figure 5:
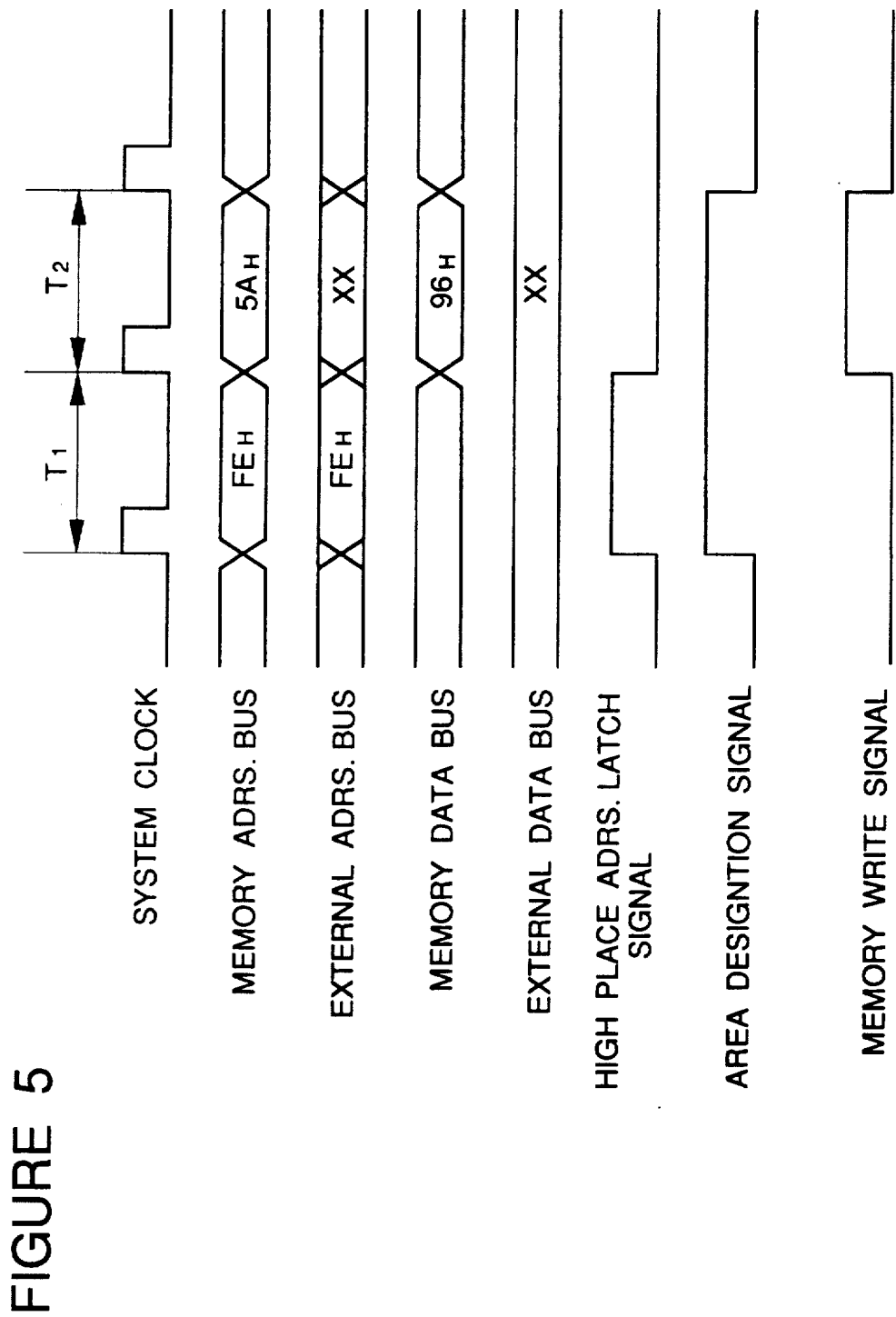
FIG. 5 is a timing chart illustrating the operation of the emulation system shown in FIG. 4 in the case of accessing the on-chip memory area.
Figure 6:
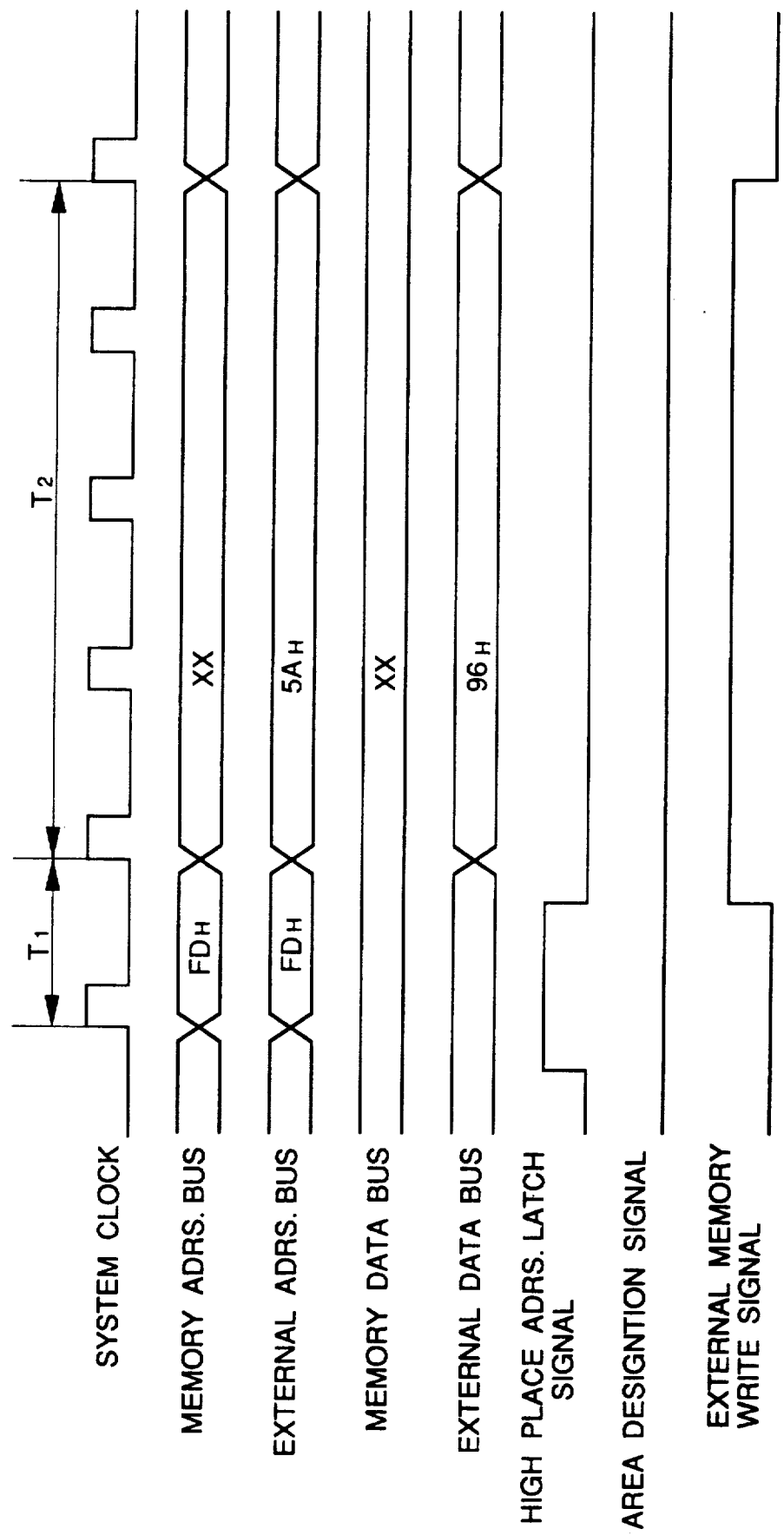
FIG. 6 is a timing chart illustrating the operation of the emulation system shown in FIG. 4 in the case of accessing the external memory.

Now, an embodiment of the emulation system in accordance with the present invention will be explained with reference to FIGS. 4 to 8. FIG. 4 is a block diagram of a first embodiment of the emulation system in accordance with the present invention. FIG. 5 is a timing chart illustrating the operation of the emulation system in the case of accessing the on-chip memory area, and FIG. 6 is a timing chart illustrating the operation of the emulation system in the case of accessing the external memory. FIG. 7 is a memory map illustrating an on-chip memory area area of 256 bytes, and FIG. 8 is a memory map illustrating an on-chip memory area of 512 bytes.

In FIG. 4, elements similar or corresponding to those shown in FIG. 1 are given the same reference numerals, and explanation thereof will be omitted. As seen from a comparison between FIGS. 1 and 4, the first embodiment of the emulation system in accordance with the present invention additionally comprises an area discriminator 60, which is in turn coupled to the memory address bus 32 and connected to receive the high place address latch enable signal 42, and which generates an area designation signal 62 to the evaluation chip 10. When the high place address latch enable signal 42 is activated, the area discriminater fetches the high place address on the memory address bus 32, and discriminates whether or not the address to be accessed is within the on-chip memory area. If the address to be accessed is within the on-chip memory area, the area discriminator 60 activates the area designation signal 62 so as to notify the CPU 12 that the address to be accessed is within the on-chip memory area. On the other hand, if the address to be accessed is not within the on-chip memory area, the area discriminator 60 does not activate the area designation signal 62. Since the area discriminator 60 discriminates whether or not the address to be accessed is within the on-chip memory area, it is possible to freely set or designate an address extent assigned to the on-chip memory area. In other words, it is possible to freely determine a first address and a last address of the on-chip memory area. In this embodiment, the CPU 12 requires two system clocks for access to the on-chip memory area but five system clocks for access to memory areas other than the on-chip memory area.

Here, assume that an on-chip memory of the target computer has the capacity of 256 bytes, and the area discriminator 60 is set to judge that addresses "FE00$_H$" to "FEFF$_H$" are the on-chip memory area as shown in FIG. 7.

Therefore, if the CPU 12 fetches an instruction from the program memory 20 and the result of instruction decoding indicates that data "96$_H$" should be written into an address "FE5A$_H$", the CPU 12 performs a necessary write operation in the sequence as shown in FIG. 5 which illustrates a timing chart of the operation of the emulation system in the case of accessing the on-chip memory area. First, the CPU 12 outputs the high place address "FE$_H$" to the memory address bus 32 and the external address bus 52, and at the same time, activates the high place address latch enable signal 42, so that the high place address "FE$_H$" is latched in the high place address latch 40 in a state T$_1$ shown in FIG. 2. When the high place address latch enable signal 42 is activated, the area discriminator 60 discriminates whether or not the address "FE$_H$" on the memory address bus 32 is within a space assigned to the on-chip memory area. In this case, since the address "FE$_H$" is within the space assigned to the on-chip memory area, the area discriminator 60 activates the area designation signal 62, and in response to the activated designation signal 62, the CPU 12 judges that the access is directed to the on-chip memory area (state T$_1$).

Thereafter, the CPU 12 outputs a lower place address "5A$_H$" to the memory address bus 32, and at the same time, outputs the data "96$_H$" to the memory data bus 34 and also activates the memory write signal 36. At this time, since the CPU 12 had already judged in the state T$_1$ that the access is directed to the on-chip memory area, the CPU executes the access in two system clocks. Thus, the data "96$_H$" is written from the CPU 12 into the address "FE5A$_H$" of the data memory 30 (state T$_2$) as access to the on-chip memory area. A read operation can be executed similarly to the above mentioned write operation, except that the memory read signal 38 is activated in place of the memory write signal 36 and the CPU 12 fetches data read out on the memory data bus 34 from the memory 30.

If the CPU 12 fetches an instruction from the program memory 20 and the result of instruction decoding indicates that data "96$_H$" should be written into an address "FD5A$_H$" which does not exist within the on-chip memory area, the CPU 12 starts a necessary write operation in the sequence as shown in FIG. 6 which illustrates a timing chart of the operation of the emulation system in the case of accessing the external memory area.

First, the CPU 12 outputs the high place address "FD$_H$" to the memory address bus 32 and the external address bus 52 in a state T$_1$ shown in FIG. 6. At the same time, the CPU activates the high place address latch enable signal 42. When the high place address latch enable signal 42 is activated, the area discriminator 60 discriminates whether or not the address "FD$_H$" on the memory address bus 32 is within a location assigned to the on-chip memory area. In this case, since the address "FD$_H$" is not within a location assigned to the on-chip memory area, the area discriminator 60 does not activate the area designation signal 62. As a result, the CPU 12 judges that access is not directed to the on-chip memory area (state T$_1$).

Thereafter, the CPU 12 outputs the lower place address "5A$_H$" to the external address bus 52, and at the same time, outputs the data "96$_H$" to the external data bus 54 and activates the external write signal 56. Thus, the data "96$_H$" is written from the CPU 12 through the external bus interface 14 into the address "FD5A$_H$" of the memory area (the external memory 50) other than the on-chip memory area (state T$_2$). In external access, however, the state T$_2$ is composed of four system clocks. A read operation can be executed similarly to the above mentioned write operation, except that the external read signal 58 is activated in place of the external write signal 56 and the CPU 12 fetches data read out onto the external data bus 34 from the external memory.

In the case of emulating a target microcomputer having an on-chip memory of 512 bytes, it is assumed that the area discriminator 60 is set to judge that addresses "FD00$_H$" to "FEFF$_H$" are the on-chip memory area as shown in FIG. 8.

In this case, if the CPU 12 fetches an instruction from the program memory 20 and the result of instruction decoding indicates that data "96$_H$" should be written into an address "FD5A$_H$", the CPU starts a necessary write operation in the sequence mentioned below. First, the CPU 12 outputs the high place address "FD$_H$" to the memory address bus 32 and the external address bus 52, and at the same time, activates the high place address latch enable signal 42. In response to the activated high place address latch enable signal 42, the area discriminator 60 discriminates whether or not the address "FD$_H$" on the memory address bus 32 is within a location assigned to the on-chip memory area. In this case, since the address "FD$_H$" is within a location assigned to the on-chip memory area, the area discriminator 60 activates the area designation signal 62. As a result, the CPU 12 write the data "96$_H$" into the address "FD5A$_H$" as access to the on-chip memory area, similarly to the above mentioned on-chip memory area writing operation in the case that the capacity of the on-chip memory area is set to 256 bytes.

If an instruction fetched from the program memory 20 were an instruction indicating that data "96$_H$" should be written into an address "FC5A$_H$", the data "96$_H$" is written into the address "FC5A$_H$" as access to a memory area other than the on-chip memory area.

In place of the external memory 50 which is accessed through the external bus interface 14, it is possible to provide, within the emulation system, a memory which can be accessed with the same access cycle as that for the external memory 50, so that the access to the external memory can be emulated by use of the internal memory.

Figure 9:
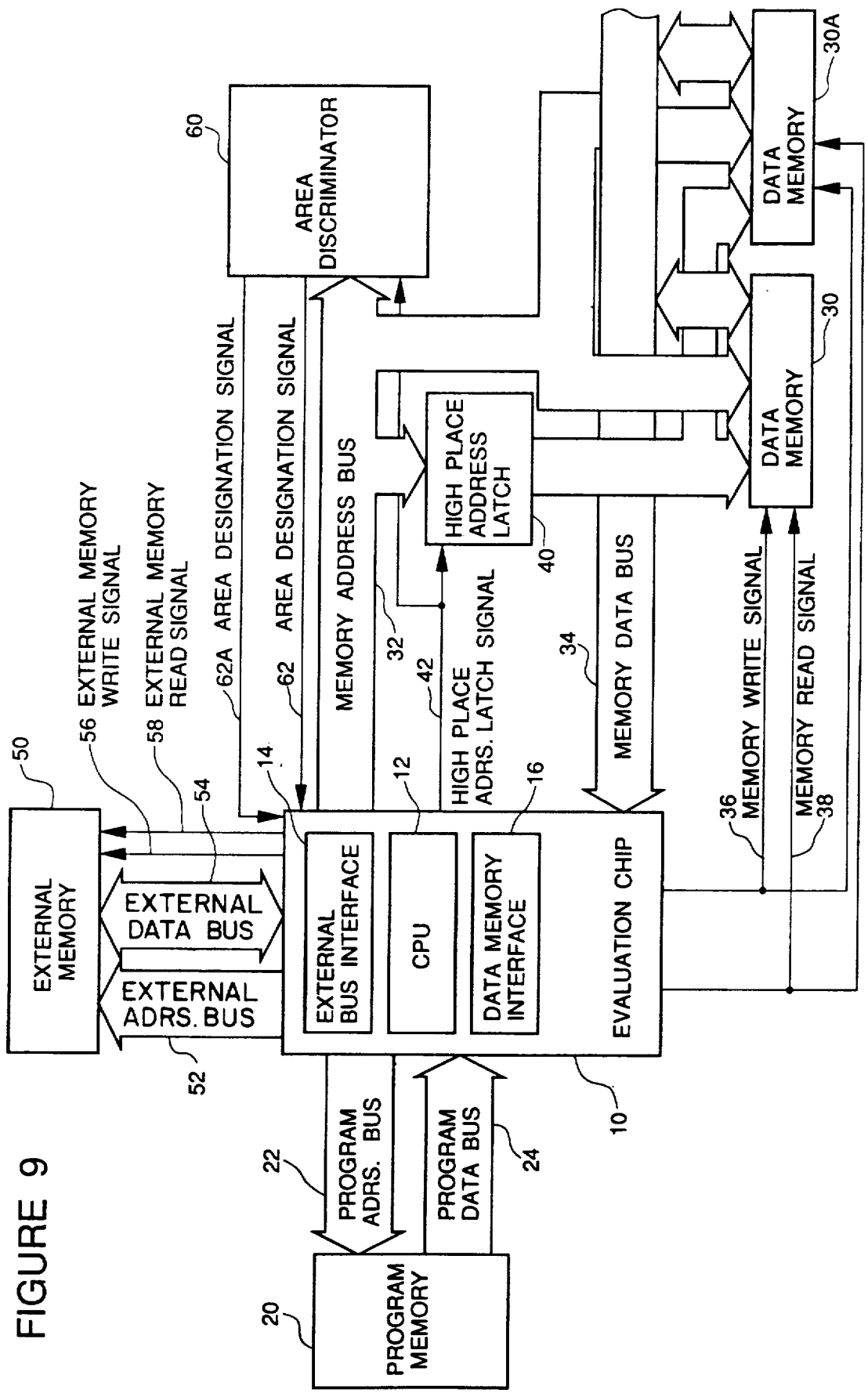
FIG. 9 is a block diagram of a second embodiment of the emulation system in accordance with the present invention.

Referring to FIG. 9, there is shown a block diagram of a second embodiment of the emulation system in accordance with the present invention. In FIG. 9, elements similar or corresponding to those shown in FIG. 4 are given the same reference numerals, and explanation thereof will be omitted.

As seen from a comparison between FIGS. 4 and 9, the second embodiment shown in FIG. 9 additionally includes a second data memory 30A, which is in turn coupled to the memory address bus 32, the memory data bus 34 and the high place address latch 40 and also connected to receive the memory write signal 36 and the memory read signal 38. The second data memory 30A is provided for emulating the target microcomputer, similarly to the first data memory 30, but is different from the first data memory 30 in the number of required access cycles. In addition, the area discriminator 60 generates not only the area designation signal 62 but also a second designation signal 62A. Both of the first and second designation signals 62 and 62A indicate whether or not the address to be accessed is within the on-chip memory area. However, the area designation signal 62 designates the first data memory 30 and the second designation signal 62A indicates the second data memory 30A.

Figure 10:
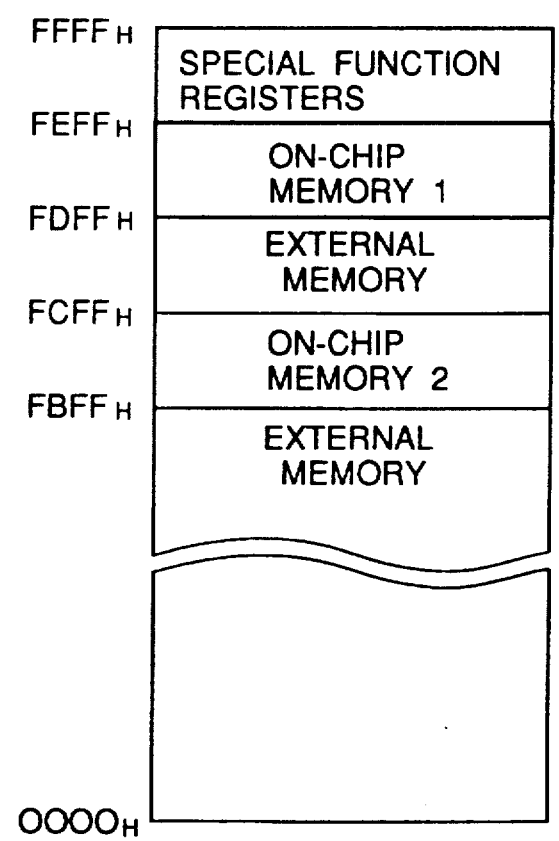
FIG. 10 is a memory map illustrating an on-chip memory area in the second embodiment.

Now, assume that a target microcomputer having a memory map shown in FIG. 10 is emulated. Addresses "FE00$_H$" to "FEFF$_H$" are assigned to an on-chip memory area 1 that requires two cycles for access, and addresses "FC00$_H$" to "FCFF$_H$" are assigned to an on-chip memory area 2 that requires three cycles for access. In this case, the area discriminator 60 is set to activate the first area designation signal 62 when the CPU accesses any of the addresses "FE00$_H$" to "FEFF$_H$" and the second area designation signal 62A when the CPU accesses any of the addresses "FC00$_H$" to "FCFF$_H$".

Thus, if an instruction fetched from the program memory 20 indicates that data "96$_H$" should be written into an address "FE5A$_H$", the data "96$_H$" is written into the first data memory 30 with two system cycles. On the other hand, if an instruction fetched from the program memory 20 indicates that data "96$_H$" should be written into an address "FC5A$_H$", the data "96$_H$" is written into the second data memory 30A with three system cycles.

As seen from the above, in the case of emulating a target microcomputer having a plurality of on-chip memories that require different numbers of access cycles, respectively, the second embodiment can emulate the target microcomputer with the proper numbers of access cycles.

As will be apparent from the above explanation, the evaluation chip (the CPU) does not determine whether or not the access space is within the on-chip memory area. The area discriminator receives a high place address of the address which is supplied from the evaluation chip, and discriminates whether or not the location to be accessed by the evaluation chip is within the on-chip memory area. In addition, the area discriminator notifies the evaluation chip of the result of discrimination to cause the evaluation chip to execute an access operation with reference to the result of discrimination. Accordingly, it is possible to emulate various target microcomputers having different on-chip memory area capacities, with respective proper access cycles.

The invention has thus been shown and described with reference to the specific embodiments. However, it should be noted that the present invention is in no way limited to the details of the illustrated structures but changes and modifications may be made within the scope of the appended claims.

I claim:

1. An emulation system comprising:

an evaluation chip for executing a program, said evaluation chip including bus control means which firstly outputs high place address information of a memory address to be accessed and then outputs low place information of said memory address to be accessed;

a first memory coupled to said evaluation chip through a first bus;

a second memory coupled to said evaluation chip through a second bus; and area discrimination means coupled to said second bus to receive said high place address information of said memory address outputted on said second bus, for discriminating whether or not said memory address is directed to said second memory, and for supplying said evaluation chip with a result of discrimination by said discriminating means;

said bus control means operating to supply said high place address information onto both said first bus and said second bus, and then, to respond to said result of discrimination to output said low place address information onto said second bus during a first period of time, if said result of discrimination indicates that said memory address is directed to said second memory, and to output said low place address information onto said first bus during a second period of time, different from said first period of time, if said result of discrimination indicates that said memory address is not directed to said second memory.

2. An evaluation chip comprising:

means for executing a program;

a first set of bus terminals coupled to a first memory through a first bus;

a second set of bus terminals coupled to a second memory through a second bus;

an area designation information input terminal for receiving area designation information indicating whether a memory address to be accessed is directed to said first memory or to said second memory, and memory access means coupled to said first set of bus terminals, said second set of bus terminals and said area designation information input terminal, said memory access means supplying high place address information of a memory address to be accessed, onto both said first set of bus terminals and said second set of bus terminals, and then, outputting low place address information of said memory address to be accessed, onto said first set of bus terminals during a first period of time, if said area designation information indicates that said memory address is directed to said first memory, and outputting said low place address information onto said second set of bus terminals during a second period of time, different from said first period of time, if said area designation information indicates that said memory address is directed to said second memory.

* * * * *